(12) United States Patent
Fortmann (10) Patent No.: US 9,035,480 B2
(45) Date of Patent: May 19, 2015

(54) WIND TURBINE AND METHOD FOR OPERATING A WIND TURBINE

(75) Inventor: Jens Fortmann, Berlin (DE)

(73) Assignee: Senvion SE, Hamburg (DE)

( * ) Notice: Subject to any disclaimer, the term of this patent is extended or adjusted under 35 U.S.C. 154(b) by 213 days.

(21) Appl. No.: 13/702,609

(22) PCT Filed: Jun. 3, 2011

(86) PCT No.: PCT/EP2011/059195
§ 371 (c)(1),
(2), (4) Date: May 17, 2013

(87) PCT Pub. No.: WO2011/154319
PCT Pub. Date: Dec. 15, 2011

(65) Prior Publication Data
US 2013/0241201 A1 Sep. 19, 2013

(30) Foreign Application Priority Data
Jun. 8, 2010 (DE) .......................... 10 2010 023 038

(51) Int. Cl.
| | |
|---|---|
| *F03D 9/00* | (2006.01) |
| *H02P 9/04* | (2006.01) |
| *H02J 3/26* | (2006.01) |
| *H02J 3/16* | (2006.01) |
| *H02J 3/38* | (2006.01) |
| *H02J 3/46* | (2006.01) |
| *H02P 11/00* | (2006.01) |

(52) U.S. Cl.
CPC ... *H02P 9/04* (2013.01); *H02J 3/26* (2013.01); *H02J 3/16* (2013.01); *H02J 3/386* (2013.01); *Y02E 40/50* (2013.01); *Y02E 10/763* (2013.01); *Y02E 40/34* (2013.01)

(58) Field of Classification Search
USPC .......................... 290/44, 55; 307/153; 322/20
See application file for complete search history.

(56) References Cited

U.S. PATENT DOCUMENTS

| | | | | |
|---|---|---|---|---|
| 6,924,991 | B2 * | 8/2005 | Skeist et al. | 363/21.02 |
| 6,954,004 | B2 * | 10/2005 | Skeist et al. | 290/44 |
| 6,984,897 | B2 * | 1/2006 | Skeist et al. | 290/44 |
| 7,071,579 | B2 * | 7/2006 | Erdman et al. | 290/55 |
| 7,233,129 | B2 * | 6/2007 | Erdman et al. | 322/17 |

(Continued)

FOREIGN PATENT DOCUMENTS

| | | |
|---|---|---|
| DE | 10 2004 048341 | 4/2006 |
| DE | 10 2005 049426 | 4/2007 |

(Continued)

*Primary Examiner* — Pedro J Cuevas
(74) *Attorney, Agent, or Firm* — Alix, Yale & Ristas, LLP (57) ABSTRACT

A method is employed for operating a wind turbine. Electrical energy is produced by means of a generator and is fed into an electrical power network. The electrical energy is fed to the secondary side of a transformer at a low voltage and is output on the primary side of the transformer at a higher voltage. The potential on the primary side of the transformer is undefined. In the method, a measured value of the voltage between the primary side of the transformer and the earth potential is first recorded. The measured value is compared with a predefined limit value. The electrical energy produced by the generator is changed if the measured value exceeds the limit value. A wind turbine is designed to carry out the method. Faults in the medium voltage network can be reacted to without an additional star point on the primary side of the transformer being required.

20 Claims, 4 Drawing Sheets

(56) References Cited

U.S. PATENT DOCUMENTS

| | | | |
|---|---|---|---|
| 7,432,686 B2 * | 10/2008 | Erdman et al. | 322/44 |
| 7,528,496 B2 * | 5/2009 | Fortmann | 290/44 |
| 7,606,638 B2 * | 10/2009 | Fortmann et al. | 700/287 |
| 7,821,162 B2 * | 10/2010 | Llorente Gonzalez et al. | 307/156 |
| 7,830,029 B2 * | 11/2010 | Wobben | 290/44 |
| 8,046,110 B2 * | 10/2011 | Mayor et al. | 700/297 |
| 8,154,833 B2 * | 4/2012 | Ritter et al. | 361/54 |
| 8,283,803 B2 * | 10/2012 | Fortmann et al. | 307/43 |
| 8,301,313 B2 * | 10/2012 | Wobben | 700/297 |
| 8,373,291 B2 * | 2/2013 | Zeumer et al. | 290/44 |
| 8,587,160 B2 * | 11/2013 | Dai et al. | 307/151 |
| 8,692,419 B2 * | 4/2014 | Fortmann et al. | 307/153 |
| 8,866,334 B2 * | 10/2014 | Donnelly et al. | 307/21 |
| 8,903,555 B2 * | 12/2014 | Nakashima et al. | 700/278 |
| 8,907,530 B1 * | 12/2014 | Saxton | 307/153 |
| 2003/0227172 A1 * | 12/2003 | Erdman et al. | 290/44 |
| 2004/0145188 A1 * | 7/2004 | Janssen et al. | 290/44 |
| 2004/0145932 A1 * | 7/2004 | Skeist et al. | 363/152 |
| 2004/0257832 A1 * | 12/2004 | Skeist et al. | 363/1 |
| 2005/0012487 A1 * | 1/2005 | Skeist et al. | 318/727 |
| 2005/0042098 A1 * | 2/2005 | Wobben | 416/132 B |
| 2005/0122083 A1 * | 6/2005 | Erdman et al. | 322/20 |
| 2006/0273595 A1 * | 12/2006 | Avagliano et al. | 290/44 |
| 2007/0085343 A1 * | 4/2007 | Fortmann | 290/44 |
| 2007/0108771 A1 * | 5/2007 | Jones et al. | 290/44 |
| 2007/0120369 A1 * | 5/2007 | Delmerico et al. | 290/44 |
| 2007/0121354 A1 * | 5/2007 | Jones et al. | 363/47 |
| 2007/0159737 A1 * | 7/2007 | Wobben | 361/20 |
| 2007/0187955 A1 * | 8/2007 | Erdman et al. | 290/44 |
| 2008/0007121 A1 * | 1/2008 | Erdman et al. | 307/47 |
| 2008/0018309 A1 * | 1/2008 | Erdman et al. | 322/20 |
| 2008/0073912 A1 * | 3/2008 | Fortmann et al. | 290/44 |
| 2008/0111380 A1 * | 5/2008 | Delmerico et al. | 290/44 |
| 2009/0055030 A1 * | 2/2009 | Mayor et al. | 700/287 |
| 2009/0066166 A1 * | 3/2009 | Llorente Gonzalez et al. | 307/130 |
| 2010/0078940 A1 * | 4/2010 | Kondo et al. | 290/44 |
| 2010/0207463 A1 * | 8/2010 | Fortmann et al. | 307/153 |
| 2010/0276930 A1 * | 11/2010 | Fortmann | 290/44 |
| 2010/0312409 A1 * | 12/2010 | Zeumer et al. | 700/287 |
| 2011/0101690 A1 * | 5/2011 | Fortmann et al. | 290/44 |
| 2011/0133678 A1 * | 6/2011 | Tomigashi | 318/400.04 |
| 2013/0175800 A1 * | 7/2013 | Bluhm et al. | 290/44 |
| 2013/0175870 A1 * | 7/2013 | Fortmann | 307/84 |
| 2013/0341934 A1 * | 12/2013 | Kawanishi | 290/1 A |
| 2014/0268926 A1 * | 9/2014 | Gupta et al. | 363/35 |

FOREIGN PATENT DOCUMENTS

| | | |
|---|---|---|
| DE | 10 2007 049251 | 4/2009 |
| DE | 10 2008 018748 | 10/2009 |
| DE | WO 2011 128438 | 10/2011 |
| EP | 1 752 660 | 2/2007 |

* cited by examiner

WIND TURBINE AND METHOD FOR OPERATING A WIND TURBINE

BACKGROUND

The invention relates to a wind turbine and a method for operating a wind turbine. The wind turbine comprises a transformer. In the method, electrical energy is produced by means of a generator and fed into an electrical grid system in a number of phases. Electrical energy is fed to the secondary side of the transformer at a low voltage. On the primary side of the transformer, the electrical energy is output at a higher voltage. The potential on the primary side of the transformer in relation to the ground potential is undefined.

Generators in wind turbines produce electrical energy at a low voltage of e.g. 690 volts. By means of a transformer associated with the wind turbine, the electrical energy is stepped up to a medium voltage of, e.g., 10 kV, 20 kV or 30 kV, and is transmitted to a medium-voltage system. Via the medium-voltage system, the electrical energy is delivered to a transformer substation of a system operator where, for the purposes of further transmission, it is stepped up to an even higher voltage of, e.g., 400 kV (or else 110 kV, 132 kV, 220 kV or 380 kV). The greater the size of the wind farm concerned, and the more remote its site of construction (e.g., in the case of offshore wind farms), the longer the associated spans for the transmission of electrical energy in the medium-voltage system will be.

On the primary side of the transformer, the potential in relation to ground is undefined. Accordingly, the primary side itself is not grounded, or in any event only weakly grounded or grounded with a high resistance, and any grounding point in the medium-voltage system is so remote that, as a result of capacitances, inductances and resistances on the lines, the potential on the primary side of the transformer may deviate from the potential at the grounding point.

Consequently, in case of a fault on the medium-voltage system (e.g., resulting from a ground fault), information on the fault concerned may not reach the wind turbine immediately. Accordingly, the wind turbine would continue the in-feed of electrical energy to its full capacity, even though the medium-voltage system possibly no longer has any capability whatsoever of outputting the electrical energy again at the other end. In this case, the cables in the medium-voltage system would sustain damage within a very short space of time. Repairs to cables in the medium voltage system are both elaborate and expensive.

SUMMARY

In consideration of this prior art, disclosed is a wind turbine and a method for operating a wind turbine whereby the risk of damage to the medium-voltage system is reduced.

In the method, a measured value for the voltage between the primary side of the transformer and the ground potential is recorded. The measured value is compared with a predefined limit value. The electrical energy produced by the generator is adjusted if the measured value exceeds the limit value. A measurement of the voltage in relation to the ground potential can provide information which cannot be retrieved by means of a measurement of the voltage between the phases alone.

A number of concepts will be explained in the first instance. The potential on the primary side of the transformer is described as undefined where the system connected at this point is either not grounded at all (i.e., has no star point, for example), or where the grounding point is so remote that the potential on the primary side of the transformer may differ from the potential at the grounding point. In particular offshore wind farms, in the case of the grounding points are generally situated on the transformer platforms, as they physically cannot be positioned in the wind turbine. In offshore wind farms, moreover, the electrical connecting lines to the transformer platform are additionally very long, thereby resulting in an undefined potential on the primary side of the transformer. Under normal circumstances, the zero phase-sequence voltage on the medium-voltage system is zero, so that the concept of an undefined potential can apply, in particular, when the electrical resistance of the electrical connection to the grounding point is so high that, in case of a fault on the medium-voltage system, specifically a voltage dip, a zero phase-sequence voltage other than zero may occur on the primary side of the transformer.

The invention will be explained with reference to the example in which a medium-voltage system is connected on the primary side of the transformer. On the secondary side of the transformer, the wind turbine is connected at a lower voltage, in relation to the primary side. The concept of a medium-voltage system is used for illustrative purposes. No restriction of the invention to a specific voltage range is to be inferred from this.

The measurement of the voltage on the primary side of the transformer in relation to the ground potential and, from a shift in the potential, to deduce the resulting consequences for the further operation of the wind turbine. The invention is based upon the knowledge that, in a voltage system, faults occur which are not primarily manifested by a change in the voltage between the phases, but by a shift in the phase potential in relation to a third point. Faults of this type are not detected, or are not detected early enough, by the measurement of the voltage between the phases alone.

The measurement of the voltage on the primary side of the transformer in relation to a third point, i.e., the ground potential is proposed. As a result, the faults concerned can be detected more rapidly, and the power in-feed from the wind turbine can be adjusted promptly. By a prompt response, any overloading and consequent damage to cables in the medium-voltage system by the excessive in-feed of power can be avoided. Specific measures adopted in the wind turbine for the adjustment of the power output—as described in greater detail below—may vary according to the circumstances concerned.

In comparison with the conventional measure, whereby a neutral grounding transformer is simply provided on the primary side of the transformer in order to produce a defined potential in relation to ground, costs are substantially reduced. For the purposes of the invention, only an additional voltage measurement is required on the primary side of the transformer, together with the adaptation of the wind turbine control system such that the latter will respond in a particular manner when specific limit values are exceeded. Conversely, the medium-voltage components required for a separate grounding point will, to a substantial extent, require additional structural space in the wind turbine which, especially in the case of offshore wind turbines, is not available.

The electrical energy generated by the wind turbine is normally fed in the form of a three-phase AC system. One form of representation of an AC system of this type involves the familiar distinction between a positive phase-sequence system, a negative phase—sequence system and a zero phase-sequence system, c.f., e.g., P. Kundur "Power System Stability and Control" (McGraw-Hill, 1994, Chapter 13.4). Where the phases in the AC system maintain a phase angle of, in this case, 120° and carry an equal voltage loading, the voltage on the zero phase-sequence system will be zero. However, in the case of asymmetrical loading conditions, e.g., as a result of a ground fault on one phase, the voltage on the zero phase-sequence system will deviate from zero. The limit value set for the purposes of the method is preferably a limit value for the voltage on the zero phase-sequence system. If the voltage on the zero phase-sequence system exceeds a predefined limit value, the power output of the wind turbine is adjusted accordingly.

The zero phase-sequence system, or zero phase-sequence voltage, is understood as the value for the present potential of all three phase voltages in relation to the ground potential, i.e., the DC component by which the oscillation of one or more phases deviates from the zero axis thereof. The mathematical method applied for the determination of the zero phase-sequence voltage is not significant. The zero phase-sequence voltage may be determined by the addition of instantaneous values for the individual phase voltages, or by the conversion of the phase vectors of the phase voltages into a zero phase-sequence phase vector by the application of complex transformation matrices, as described in the literature.

Depending upon the form of representation concerned, various limit values may constitute the limit value for the zero phase-sequence voltage. The limit value may relate to the magnitude or length of the complex zero phase-sequence phase vector. Alternatively, this can refer to a limit value for the sum of the instantaneous phase voltages in relation to the ground potential. As a further possibility, the limit value may relate to a unilateral asymmetrical overvoltage in relation to the maximum voltage amplitude on one phase during an AC cycle. In this case, the invention is explained by the application of a relative definition of a limit value in relation to the standard voltage value. Any conversion into the respective other forms of representation may be derived from the relevant literature. With reference to the zero phase-sequence system, where a limit value is described, this is understood to include all forms of representation.

The measured value on the primary side of the transformer is preferably recorded in such a way that the voltage on the zero phase-sequence system can be determined from this measured value. If a star point, which is not grounded, is provided on the primary side of the transformer between the phases of the AC system, the voltage on the zero phase-sequence system will correspond to the voltage between the star point and the ground potential. In this case, the voltage on the zero phase-sequence system can therefore be measured directly. Accordingly, an arrangement may also be provided in which resistors of high rating are used to create an artificial star point between the phases, and the voltage on the zero phase-sequence system is determined by the measurement of the voltage between the artificial star point and the ground potential. Alternatively, the voltage in relation to the ground potential may also be measured on all the phases of the AC system. The voltage on the zero phase-sequence system is determined by adding the instantaneous values of all three phase voltages, then dividing by the number of phases.

A first limit value for the voltage on the zero phase-sequence system may be defined such that, where this limit value is exceeded, the normal operation of the wind turbine is discontinued. This limit value for the voltage on the zero phase-sequence system may range, e.g., from 1% to 5% of the rated voltage. If the limit value is determined from the voltage between the phases and the ground potential, the first limit value may be defined, e.g., such that the voltage on a first phase stands at 105% of the rated voltage, whereas the rated voltage on a second phase is not exceeded. If the voltage exceeds this first limit value, although normal operation will be discontinued, it is still possible for the wind turbine to remain in service for a limited time.

On the medium-voltage system, in the case of the occurrence of a fault on one phase of the AC system, and the consequent presence of a voltage on the zero phase-sequence system, the voltage on the two remaining phases will consequently rise and fall in response to the frequency on the AC system. The permissible loading of the two other phases will therefore be periodically exceeded as a result. Under these operating conditions, the cables on the medium-voltage system may sustain damage, even after a short period of service. The voltage on the zero phase-sequence system cannot be directly influenced by the adoption of measures on the wind turbine generator. It is possible, however, for the overall amplitude of voltage to be reduced. On the medium-voltage system, this permits the elimination of voltage peaks, with a consequent reduction of cable loading. Accordingly, in one form of embodiment of the method, the adjustment of the electrical energy produced by the generator is achieved in that, once a first limit value is exceeded, the amplitude of voltage is reduced. To this end, the in-feed of reactive power is preferably adjusted in an appropriate manner, and in particular a higher proportion of inductive reactive current is fed in. The in-feed of active current may also be reduced, in order to achieve a further reduction of cable loading.

The adjustment of the electrical energy produced by the generator may be undertaken with reference to the positive phase-sequence system or negative phase-sequence system. Where the loading of all phases on the AC system is to be reduced in a symmetrical manner, inductive reactive current may be fed in on the positive phase-sequence system as a means of reducing the voltage. If in addition, or alternatively, the correction of deviations in the phase angle is required, appropriate measures for this purpose may be adopted on the negative phase-sequence system. Specifically, inductive reactive current may be fed in on the negative phase-sequence system. Specific measures to be implemented may be agreed with the system operator.

In place of a limit value for the voltage on the zero phase-sequence system, a limit value may also be set for the phase voltage, as a value calculated from the positive phase-sequence voltage, the negative phase-sequence voltage and the zero phase-sequence voltage. As a first limit value for normal operation, above which the electrical energy produced by the generator is adjusted, a value e.g., of 105% of the rated voltage may be set.

In the method, as an alternative or in addition to the first limit value, a second limit value can be defined, whereby, once this second limit value is exceeded, operation of the wind turbine is no longer possible, even for a short period. Where the second limit value relates to the voltage on the zero phase-sequence system, a value, e.g., ranging from 10% to 20% of the rated voltage may be adopted.

Where the second limit value relates to the voltage between the phases and ground potential, this second limit value may be set, e.g., at 110%, 120% or 130% of the rated voltage on a first phase, while the rated voltage on another phase is not exceeded.

Normal shutdown of the wind turbine takes some time. Under certain circumstances, the continuing in-feed of electrical energy from the wind turbine during shutdown may be sufficient to cause damage to cables on the medium-voltage system. Accordingly, provision may be included for rapid shutdown once the second limit value is exceeded. In a first stage of rapid shutdown, the setpoint values for the active current and the reactive current may be set to zero. In the second stage, a disconnector may be opened in order to isolate the wind turbine from the grid system. By the execution of these measures, it is possible during rapid shutdown for the power output to be reduced to zero within less than 60 ms, and preferably within less than 30 ms. Accordingly, the reduction of the power output to zero is significantly more rapid than that previously possible with the opening of the disconnector alone, which requires approximately 100 ms. This is made possible by the use of converter technology as a means of interrupting power output. Conversely, however, some acceleration of the rotor must be accepted.

In a further form of embodiment, the system voltage can be actively reduced, once the second limit value is exceeded. This may involve the take-up of power from the grid system by the wind turbine, by means of the take-up of power by the converter (or additionally, in the case of a double-fed asynchronous machine, by the generator). The power may be dissipated for example by the connection of a resistor on the intermediate circuit and/or by the short-term delivery of power to the rotor.

When the first limit value is exceeded, normal operation of the wind turbine will be discontinued. The wind turbine can only remain in service under these operating conditions for a limited time without causing damage to the grid system infrastructure. If the wind turbine is maintained out of normal service for longer than this limited time, it may be considered that a second limit value has been exceeded. If the second limit value, defined accordingly, is exceeded, the shutdown of the wind turbine may be initiated. Rather than an individual second limit value, a characteristic curve may also be logged, in which the permissible duration of various states (e.g., voltages on the zero phase-sequence system) is defined. For values exceeding this characteristic curve, the procedure applied can be as per an excess value in relation to the second limit value.

In case of a fault, to which the wind turbine responds by the method, the disconnector on the transformer substation will open as scheduled after a short time interval, and the medium-voltage system will be separated from the remainder of the grid system. Specifically in the case of a high proportion of inductive reactive current in-feed from the wind turbine, the opening of the disconnector is characterized by an abrupt voltage variation. Accordingly, the occurrence of an abrupt voltage variation of this type may be used as a criterion for the shutdown of the wind turbine. Conversely, if no abrupt voltage variation occurs within a given time following the occurrence of a fault, this will indicate that the disconnector has not opened and, accordingly, the continuing in-feed of power from the wind turbine is required. In consequence, the absence of the abrupt voltage variation may be taken as a criterion for refraining from the shutdown of the wind turbine. Accordingly, the continuing operation of the wind turbine is made dependent upon the occurrence of an abrupt voltage variation. If the wind turbine remains in service, it will preferably assume a state in which the maintenance of continuous duty will be possible, notwithstanding the persistence of the fault. This state may imply, e.g., the delivery of the full electrical energy output, insofar as possible, to the undisturbed phases, and the adjustment of the reactive power in-feed to limit values which are defined for continuous duty.

The measured values recorded on the primary side of the transformer for the voltage in relation to the ground potential can be processed directly in the converter. This provides the advantage of a short response time. Alternatively, the measured values may also be processed in the first instance in a control system of the wind turbine, which will then transmit signals to the converter. This arrangement involves a slightly longer response time, but permits the delivery of more complex responses.

The measured value on the primary side of the transformer may be recorded continuously, or sampled at an appropriate frequency. In order to exclude any disturbances at a higher frequency, the calculated zero phase-sequence voltage may be subject to low-pass filtering with a limit frequency, e.g., of 20 Hz.

In an alternative form of an embodiment of the method, the measured value recorded on the primary side of the transformer is considered, not only in a single wind turbine, but in a number of wind turbines, for the purposes of the adjustment of the electrical energy produced by the generator. To this end, it may be provided that a wind turbine transmits a signal to other wind turbines as soon as the measured value recorded on the primary side of the transformer has exceeded a limit value. In an advantageous form of embodiment, this wind turbine is located remotely from a grounding point, on which the medium-voltage system is grounded and, accordingly, has a defined potential in relation to the ground potential. The greater the distance of a wind turbine from the grounding point, the greater the likelihood of the occurrence of voltages on the zero phase-sequence system. In place of direct transmission between wind turbines, the measured value may be transmitted for processing to a central control system (farm master) of the wind farm. The farm master can then issue instructions to individual wind turbines regarding the form in which their power output is to be adjusted following the detection of a fault.

A wind turbine is designed for the execution of the method. The wind turbine comprises a generator for the production of electrical energy, together with a transformer. The transformer receives electrical energy from the generator on a secondary side, and delivers this electrical energy again at a higher voltage on a primary side, whereby the potential on the primary side of the transformer is undefined. A sensor is used to record a measured value for the voltage between the primary side of the transformer and the ground potential. A logic module compares the measured value with a predefined limit value. By means of a control system, the electrical energy produced by the generator is adjusted, if the measured value exceeds the limit value.

The wind turbine may be combined with further characteristics, which are described above with reference to the method.

BRIEF DESCRIPTION OF THE DRAWINGS

The invention is described by way of example below, with reference to the attached diagrams with the aid of advantageous forms of embodiment. In these diagrams.

DETAILED DESCRIPTION

Figure 1:
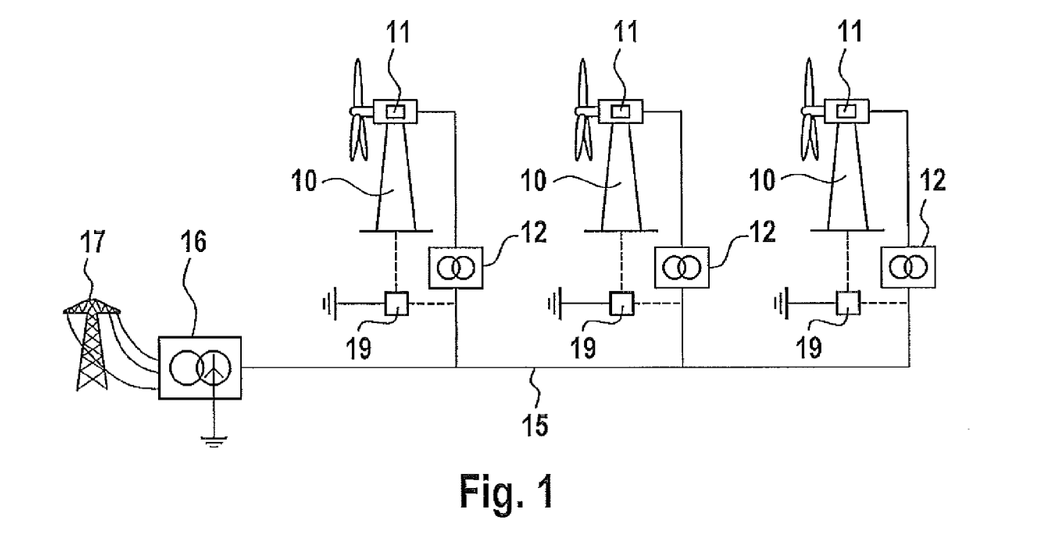
FIG. 1 shows a schematic representation of a wind farm.

A wind farm, as represented in FIG. 1, comprises three wind turbines 10 which produce electrical energy by means of a generator 11, which is then fed into a grid system. The generator 11 delivers the electrical energy in the form of a three-phase current, e.g., at a voltage of 690 V. The wind turbine 10 comprises a transformer 12 which steps up the electrical energy delivered by the generator 11 to a higher voltage, e.g., to a medium voltage of 10 kV. The transformer 12 receives electrical energy from the wind turbine 10 on a secondary side 13, and delivers this electrical energy on a primary side 14 to a medium-voltage system 15 of the wind farm. The wind farm also comprises a transformer substation 16 in which, prior to transmission to a public electrical energy distribution system 17, the electrical energy is stepped up to an even higher voltage, e.g., an e.h.v. of 400 kV.

Figure 2:
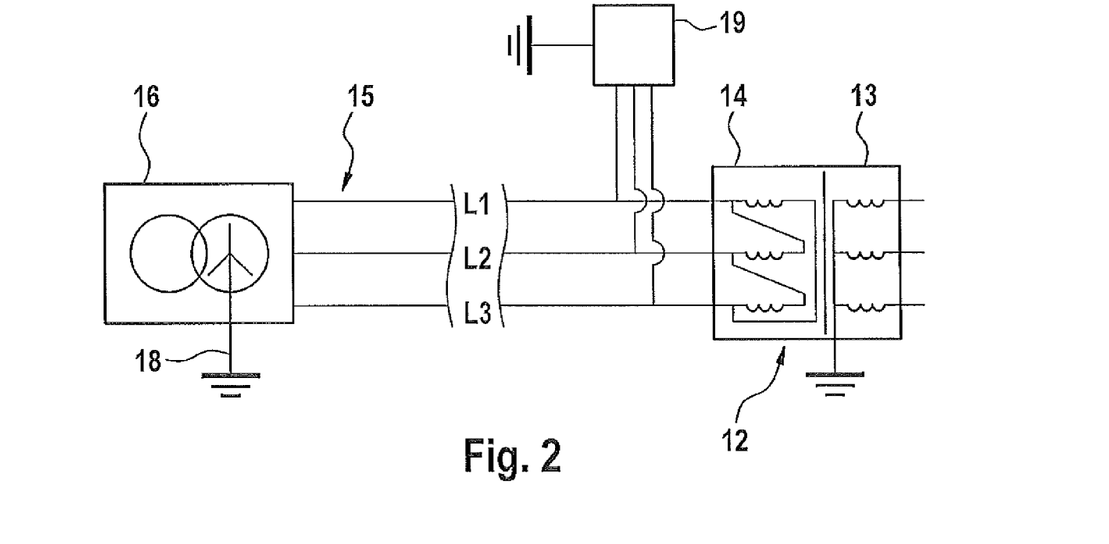
FIG. 2 shows a schematic representation of a medium-voltage system.

The transformer 12 of the wind turbine 10, as shown in FIG. 2, is a transformer with a star-delta connection, in which the star point on the secondary side 13 is grounded, whereas the primary side 14 has no defined potential in relation to ground. A grounded star point 17 is only provided at the other end of the medium-voltage system 15, i.e., in the transformer substation 16. Grounding may be of the compensated type, wherein the star point is grounded via an adjustable throttle control. By means of compensated grounding, it is intended that the current at the point of occurrence of the fault should be reduced to zero, thereby allowing operation to continue, notwithstanding the fault concerned. Low-resistance or current-limited grounding is also possible, with a throttle rating, e.g., of 20-30 ohms. Finally, solid grounding is also possible, with a resistance of less than 1 ohm.

The medium-voltage system 15 may be extensive, specifically in the case of a large wind farm. As a result of the capacitances, inductances and resistances of the cables in the medium-voltage system 15, the potential on the primary side of the transformer 12 will not necessarily coincide with the potential of the star point 18 at the other end of the medium-voltage system 15. Accordingly, the potential on the primary side 14 of the transformer 12 is undefined. In the case of the occurrence of a fault on the medium-voltage system 15, e.g., in the form of a single-phase ground fault, the potential in relation to ground on the primary side 14 of the transformer 12 may change, although this may not be immediately evident from the measurement of the voltage between the phases.

Figure 5:
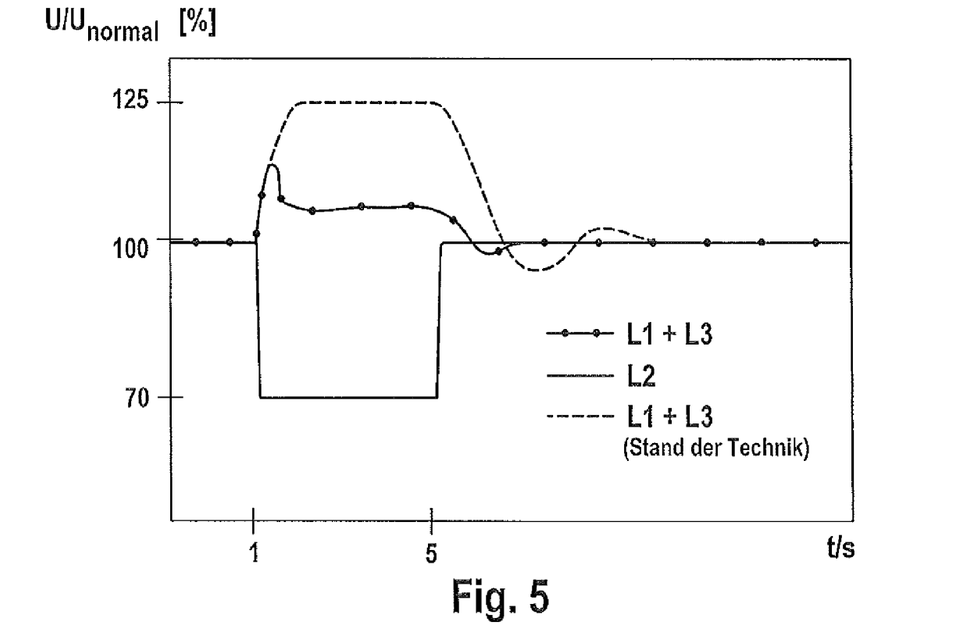
FIGS. 5 and 6 show schematic representations of the voltage characteristic on the three phases of an AC system.

FIG. 5 shows an exemplary and schematic representation of the voltage characteristic on the primary side 14 of the transformer 12 in the three phases L1, L2, L3 of the medium-voltage system 15 in relation to the ground potential. In the time between 0 seconds and 1 second, the medium-voltage system 15 is in its normal state. All three phases L1, L2, L3 carry an AC voltage, wherein the voltage characteristics are displaced in relation to each other by an angle of 120° in each case. At any point in time, the sum of the instantaneous voltages is zero, such that there is no voltage on the zero phase-sequence system. The amplitude of the voltages U is precisely 100% of the voltage $U_{normal}$ which, in normal operation, should not be exceeded.

After 1 second, a fault occurs on phase L2, as a result of which the voltage on phase L2 dips to a value of 80% of the voltage $U_{normal}$ (in relation to the ground potential). In response to the ground fault, the sum of the instantaneous voltage values is no longer equal to zero and, in consequence, a voltage is present on the zero phase-sequence system. On phases L1 and L3, the voltage in relation to the ground potential rises rapidly following the occurrence of the fault.

If only the voltage between the phases were to be measured, the strong rise in voltage would not be immediately obvious. Even if the voltage values are considered on the secondary side 13 of the transformer 12, the fault will not be directly perceptible. This will even apply where a grounded star point is provided on the secondary side 13 of the transformer 12, as the zero phase-sequence system is not routed through the transformer 12.

In the absence of the method, the voltage amplitude on the two remaining phases L1 and L3, as represented by the dashed line in FIG. 5, would rise, e.g., to a value of 125% (in relation to the ground potential). If the fault can be cleared at time t=5 s, the voltage on phase L2 will return to the original value of 100% and, after a short transient recovery phase, the voltage on phases L1 and L3 would also re-adjust within the normal range. As a result of the high voltage on phases L1 and L3, there is a risk that the cables which are rated for the normal voltage will sustain damage.

By the method, the loading of the cables in phases L1 and L3 is reduced. If the voltage U on phases L1 and L3, in relation to the ground potential, exceeds 110% of the voltage $U_{normal}$, this will be deemed to exceed the first limit value, and the power output will be adjusted accordingly. The wind turbine feeds inductive reactive current into phases L1 and L3, and the voltage on the phases is reduced to the order of 105%, as shown by the line marked with dots in FIG. 5. Accordingly, the voltage lies within a range which can be tolerated by the cables. For the further reduction of cable loading, the active current in-feed may also be reduced. Upon the clearance of the fault at t=5 s, the normal power output is restored such that, finally, all phases are restored to the normal voltage.

Figure 6:
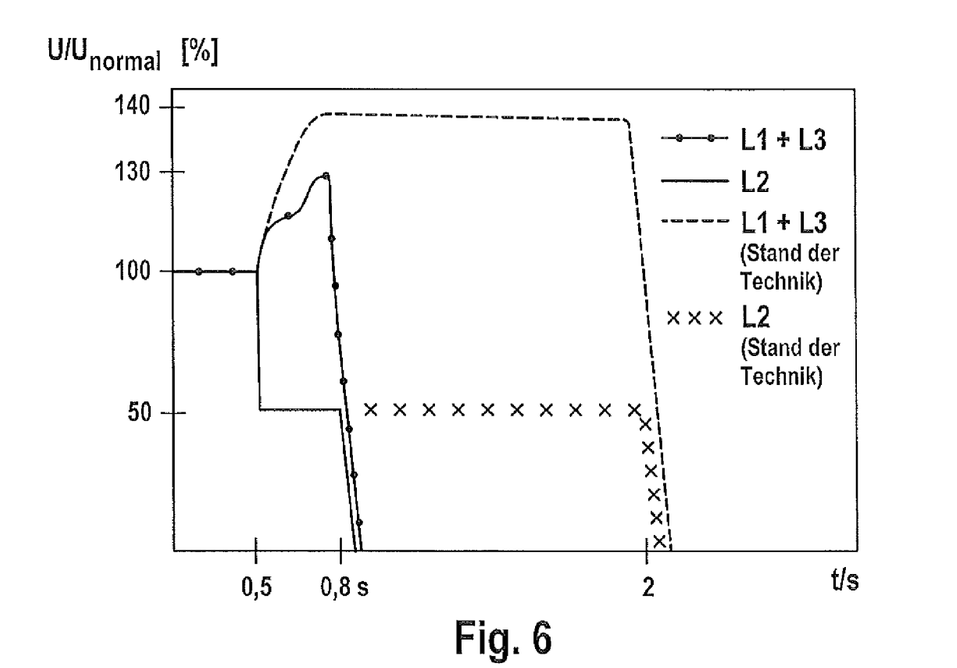

In the second schematic illustrative example shown in FIG. 6, a ground fault occurs on phase L2 of the medium-voltage system 15 between the wind turbine 10 and the transformer substation 16 after 0.5 seconds. At the location of the ground fault, which is close to the transformer substation 16, the electrical resistance between the phase L2 and the ground potential is close to zero, such that the voltage on phase L2 at this point also dips to a value which is close to zero. However, as a result of the distance to the ground fault, the voltage on the primary side 14 of the transformer 12 will not collapse entirely, but assumes a value of, e.g., 50% of the normal voltage. The voltage on phases L1 and L3 rises as a result. By the method according to the invention, it will be detected within a short space of time that the voltage on phases L1 and L3 exceeds the first limit value of 110%, and an attempt will be made to limit the voltage by the in-feed of inductive reactive current. It is also possible to initially limit the rise in voltage, as shown by the line marked with dots in FIG. 6.

However, within fractions of seconds of the occurrence of the fault, it will be established in the transformer substation 16 that the fault concerned is severe. In consequence, a disconnector will be actuated in the transformer substation 16 for the separation of the medium-voltage system 15 from the transformer substation 16. However, as no further injection of power to the grid system on phases L1 and L3 is now possible, and the power in-feed is restricted to the short-circuit connection, the voltage on phases L1 and L3 continues to rise, notwithstanding the countermeasures according to the invention. At time t=0.8 s, the voltage on phases L1 and L3 exceeds the second limit value of 130%. Once the second limit value is exceeded, rapid shutdown of the wind turbine 10 takes place, such that the power output is reduced back to zero within 60 ms.

After the occurrence of a fault, in the absence of the method, the voltage on phases L1 and L3 would rapidly rise to a value e.g., of 140%. Only upon the receipt of an external instruction, received in this case at time t=2 s, would the power output of the wind turbine 10 be reduced. By that time, damage to cables may already have been sustained.

The opening of the disconnector in the transformer substation is often associated with an abrupt voltage variation on the undisturbed phases L1 and L3. An abrupt voltage variation of this type may be considered as a further criterion for the immediate shutdown of the wind turbine.

By the method, it is also possible for wind turbines to also continue to be operated over a longer period in the case of an asymmetrical disturbance on the grid system. This is specifically beneficial where a fault on the medium-voltage system cannot be cleared in the short term, a situation which may occasionally occur, e.g., in an offshore wind farm. In the simplest case, a remote control line may be used to transmit a signal for the continuing operation of the wind turbine, such that the wind turbine will assume continuous duty, in due consideration of the first and second limit values and/or of further limit values which are specifically defined for continuous duty. In this case, power is predominantly or exclusively fed into the undisturbed phases, and a zero phase-sequence voltage is tolerated by the wind turbine.

As indicated, the opening of the disconnector is associated with an abrupt voltage variation on the undisturbed phases. Conversely, the absence of any such abrupt voltage variation indicates that the medium-voltage system remains connected to the transformer substation. Accordingly, as described hereafter, the absence of an abrupt voltage variation may be considered as a criterion for the continuing operation of the wind turbine. By the method, as described with reference to FIGS. 5 and 6, in the case of the presence of a zero phase-sequence voltage, the wind turbine responds for the reduction of said zero phase-sequence voltage. Depending upon the depth of the voltage dip, the disconnector is now expected to open after a certain predefined time, in order to isolate the fault from the grid system. During the in-feed of inductive reactive current, the wind turbine will detect this separation from the occurrence of a sudden voltage change on the undisturbed phases, e.g., in the form of an abrupt voltage drop. In the absence of any such sudden voltage change within a predefinable time interval, it is evident that no separation from the medium-voltage system is required, and the wind turbine will assume continuous duty on the asymmetrical system. To this end, the wind turbine makes the necessary adjustment for compliance with the limit values for continuous duty. For example, the reduced in-feed of active current may be increased again, and the reactive current in-feed adjusted to the limit values for continuous duty.

Figure 4:
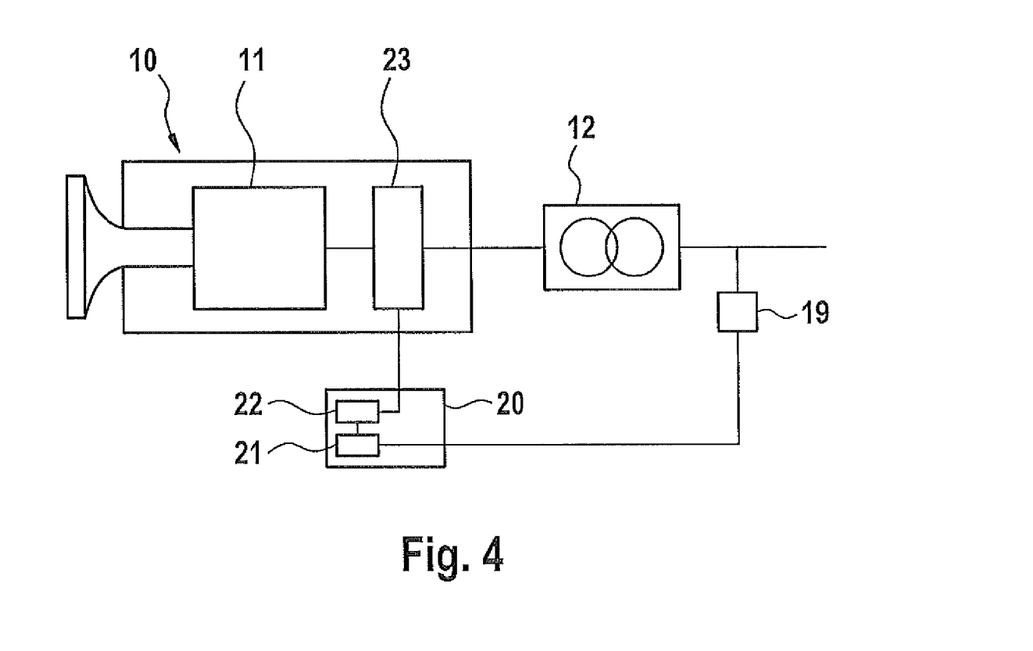
FIG. 4 shows a schematic representation of a wind turbine, which is designed for the execution of the method.

For the execution of the method, each wind turbine 10 is provided with a sensor 19 for the voltage on the primary side 14 of the transformer 12. The resistance of the sensor 19 is sufficiently high to prevent any interference with the potential on the primary side 14. The sensor 19 captures the voltage in relation to the ground potential on all three phases L1, L2, L3 in the vicinity of the transformer 12. As shown in FIG. 4, the measured values from the sensor 19 are routed to the control system 20 of the wind turbine 10. In a computing module 21, the voltage $U_0$ on the zero phase-sequence system is calculated on a continuous basis from the instantaneous voltage values on phases L1, L2, L3. Provided that—as shown in FIG. 5 prior to the occurrence of the fault—the voltage amplitude is equal and the phase angle of 120° is maintained, there is no voltage on the zero phase-sequence system. After the occurrence of the fault, the voltages taken together no longer cancel each other out, and the voltage on the zero phase-sequence system assumes a value other than zero.

A logic module 22 in the control system 20 undertakes the continuous comparison of the voltage $U_0$ on the zero phase-sequence system delivered by the computing module 21 with a first predefined limit value, and thereby executes a comparison between a measured value recorded on the primary side 14 of the transformer 12 and a limit value. This first limit value is exceeded where the voltage on the zero phase-sequence system is greater than 5% of the rated voltage. Provided that the voltage on the zero phase-sequence system is lower than 5% of the rated voltage, it will therefore be assumed that the medium-voltage system 15 is in the normal operating state.

If the first limit value is exceeded, the control system 20 generates a command on the converter 23 of the wind turbine for the adjustment of the electrical energy output, such that the loading of the medium-voltage system 15 is reduced. Specifically, the command may involve, e.g., the increased in-feed of inductive reactive current. In particular in the case of an asymmetrical fault, a command may be generated for the in-feed of inductive reactive current in the negative phase-sequence system. Particular responses to be applied may be agreed with the grid system operator. By the in-feed of reactive current, the electrical energy produced by the generator 11 is adjusted. The inductive reactive current results in the overall reduction of the voltage level such that, as shown in the example in FIG. 5, the voltage on phases L1 and L3 assumes a value, e.g., of 105% of the normal voltage $U_{normal}$ rather than a value of 125%. A voltage value of 105% can be accommodated by the cables of phases L1 and L3, with no resulting damage.

FIG. 5 represents the case wherein the fault on phase L2 can be cleared at time t=5 s. If, by the application of the method, the voltage on the medium-voltage system can successfully be maintained within specific limits, operation can continue after the clearance of the fault with no resulting impairment. In other cases (see FIG. 6), the rapid clearance of the fault may not be possible, but rather a disconnector on the transformer substation 16 is opened, thereby isolating the medium-voltage system 15 from the remainder of the grid system. Should the wind turbine 10 continue to deliver its full power in-feed, even for a short time, damage may be sustained by the cables on the medium-voltage system 15, notwithstanding the isolation thereof from the grid system.

Information to the effect that the medium-voltage system 15 has been isolated at the transformer substation 16 cannot be directly detectable on the primary side 14 of the transformer 12 either, if only the voltage between the phases L1, L2, L3 is measured. In this regard too, the voltage on the zero phase-sequence system is a more meaningful variable. Where the medium-voltage system 15 is isolated at the transformer substation 16 and the wind turbine 10 continues to deliver its full power in-feed, the voltage on the zero phase-sequence system rises rapidly. An attempt may be made in the first instance to achieve a general reduction in the voltage level by the in-feed of inductive reactive current on the positive phase-sequence system, in the hope that the disconnector on the transformer substation 16 will reclose automatically. However, should the medium-voltage system 15 remain separated from the transformer substation 16, the voltage on the zero phase-sequence system, after the first limit value has been exceeded, will also exceed a second limit value within a short space of time. Once the second limit value is exceeded, further operation will no longer be possible, even for a short period. A value of, e.g., 50% of the rated voltage may be considered as the second limit value for the zero phase-sequence voltage.

Where the logic module 22 of the control system 20 confirms that the second limit value has been exceeded, the control system 20 will submit a shutdown command to the wind turbine. In response to the shutdown command, the wind turbine 10 executes a rapid shutdown. To this end, the setpoint values for the active current and the reactive current are set to zero in the first instance. Only then is a disconnector opened for the separation of the wind turbine 10 from the grid system. Accordingly, it is possible for the power output to be reduced to zero within 20-60 ms following the receipt of the shutdown command. This is significantly more rapid than the shutdown time achieved previously by the opening of a disconnector alone. If necessary, power can be tapped from the grid system during the rapid shutdown, in order to additionally reduce the loading of the grid system. The power can be dissipated via a resistor which may be connected, e.g., on the intermediate circuit of the converter. A short-term power output to the rotor is also possible.

Even if, after the departure from normal operation, the voltage on the zero phase-sequence system does not rise to the extent that an immediate shutdown of the wind turbine 10 is necessary, operation cannot be sustained indefinitely. The closer the approach of the voltage on the zero phase-sequence system to the second limit value, the shorter the possible time for the maintenance of operation will be. A characteristic curve may be logged in the control system 20 of the wind turbine 10, an extract from which is reproduced in the table below. Where the voltage $U_0$ on the zero phase-sequence system exceeds the fraction of the rated voltage $U_{nominal}$ indicated in column 1, operation may be maintained for the time T indicated in column 2. Should the voltage $U_0$ on the zero phase-sequence system fail to fall back below this value within the time T, the wind turbine 10 must be shut down.

Accordingly, upon the exceeding of the characteristic curve too, a second limit value is exceeded.

| $U_0/U_{nominal}$ | T |
|---|---|
| 5% | Unlimited |
| 10% | 30 s |
| 20% | 10 s |
| 400 | 2 s |
| 50% | 0 s |

Figure 3:
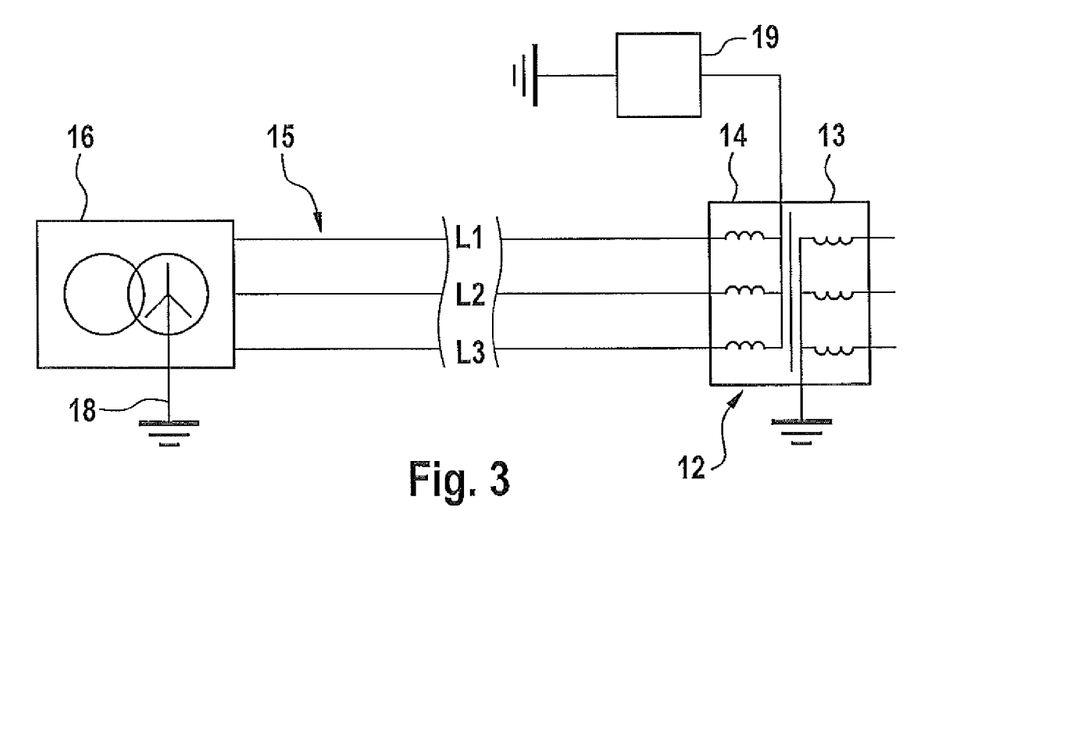
FIG. 3 shows a further form of embodiment, considered from the same view as in FIG. 2.
Figure 8:
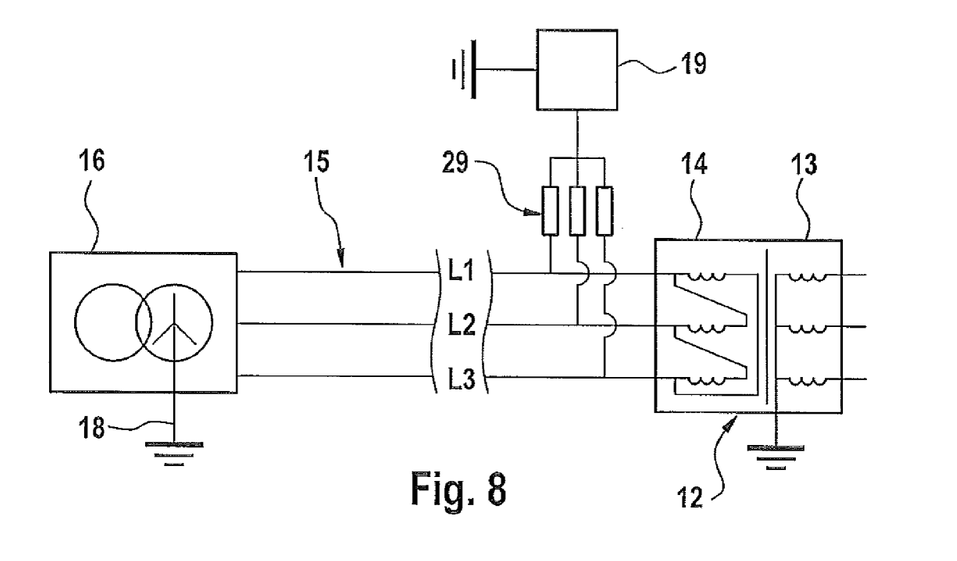
FIG. 8 shows a further form of embodiment of the invention, considered from the same view as in FIG. 2.

In the form of embodiment represented in FIG. 2, the primary side 14 of the transformer 12 is delta-connected. Accordingly, there is no star point from which a direct reading of the zero phase-sequence voltage could be taken. Consequently, voltage measurement using the sensor 19 is executed externally to the transformer 12, but sufficiently close to the transformer 12 to permit direct conclusions to be drawn in respect of the voltage on the primary side 14. In another form of embodiment, as represented in FIG. 3, the primary side 14 of the transformer 12 is also star-connected. In this case too, however, only the star point on the secondary side 13 is grounded. A reading of the zero phase-sequence voltage on the medium-voltage system 15 can be taken directly from the star point on the primary side 14. Accordingly, the sensor 19 takes readings from the star point on the primary side 14, and measures the voltage in relation to the ground potential. The measured value may be fed directly to the logic module 22, in which a comparison with the first limit value and the second limit value is executed. In yet a further form of embodiment, as shown in FIG. 8, an artificial star point is formed on the primary side 14 of the transformer 12 via resistors of high rating 29. Here again, the sensor 19 can execute the direct measurement of the zero phase-sequence voltage.

Figure 7:
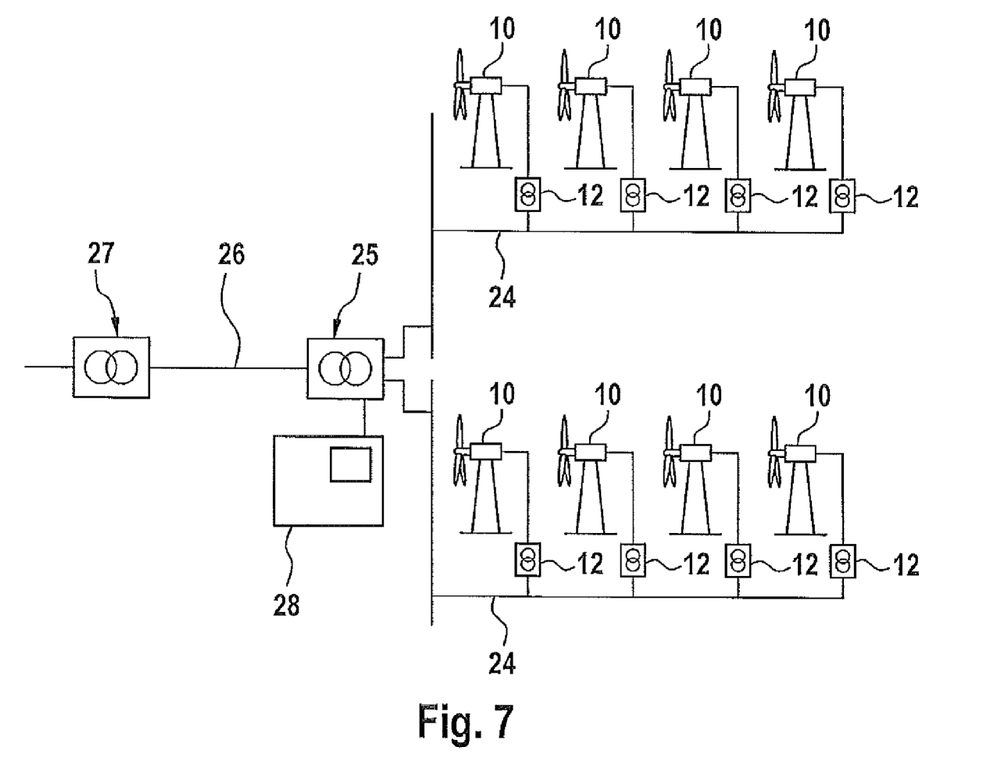
FIG. 7 shows a schematic representation of an offshore wind farm.

FIG. 7 shows a schematic representation of an offshore wind farm, in which four wind turbines 10 respectively are connected on two strings. The electrical energy produced by the wind turbines 10 is stepped up to a medium voltage of 10 kV by transformers 12, and transmitted via an internal grid system 24 in the wind farm to a point of transfer 25. Here, the electrical energy is transferred via a further transformer to an undersea cable 26, prior to its onshore transfer to the public grid system at 27. In the case of the occurrence of a fault (e.g., a ground fault) on one string of a wind farm of this type, the method according to the invention may be applied in an attempt to maintain the voltage on that string within acceptable limits, in order to avoid an immediate separation of the string from the remainder of the grid system. To this end, as described above, the individual wind turbines 10 may record measured values on the primary side of their associated transformer 12 and respond accordingly, where the voltage on the zero phase-sequence system exceeds first or second limit values.

Alternatively, it is also possible for the response of multiple wind turbines 10 to be dependent upon the measured values recorded on a wind turbine 10. For the recording of the measured values, a wind turbine 10 will be selected, for which the highest voltages on the zero phase-sequence system are anticipated. This will customarily be the wind turbine which is furthest removed from the point of transfer 25, and consequently from the nearest grounded star point. The measured values recorded on this remote wind turbine 10 may be routed directly to the other wind turbines 10 in the string, such that the latter will be able to react according to the invention. It is also possible for the measured values to be routed in the first instance to a farm master 28, which will then issue a centralized decision regarding which wind turbine 10 is to respond and how, and will transmit corresponding commands to the wind turbine 10.

The invention claimed is:

1. A method for the operation of a wind turbine comprising a transformer, wherein electrical energy is produced by means of a generator and fed into an electrical grid system in a number of phases (L1, L2, L3), whereby the electrical energy is fed to the secondary side of a transformer at a low voltage, and is delivered at a higher voltage on the primary side of the transformer, whereby the potential on the primary side of the transformer is undefined in relation to the ground potential, with the following stages:
   a. recording of a measured value for the voltage between the phases (L1, L2, L3) on the primary side of the transformer and the ground potential;
   b. comparison of the measured value with a predefined limit value;
   c. adjustment of the electrical energy produced by the generator, if the measured value exceeds the limit value.

2. The method as claimed in claim 1, characterized in that the limit value is determined based on a zero phase-sequence voltage ($U_0$) wherein the zero phase-sequence voltage ($U_0$) is a resent potential of the phases (L1, L2, L3) in relation to the ground potential.

3. The method as claimed in claim 2, characterized in that a first limit value is predefined whereby, once this first limit value is exceeded, the wind turbine is able to remain in service for a limited time (T), and in that a second limit value is predefined whereby, once this second limit value is exceeded, the wind turbine is shut down.

4. The method as claimed in claim 1, characterized in that the limit value relates to the voltage between the phases (L1, L2, L3) and the ground potential.

5. The method as claimed in claim 4, characterized in that a first limit value is predefined whereby, once this first limit value is exceeded, the wind turbine is able to remain in service for a limited time (T), and in that a second limit value is predefined whereby, once this second limit value is exceeded, the wind turbine is shut down.

6. The method as claimed in claim 1, characterized in that a first limit value is predefined whereby, once this first limit value is exceeded, the wind turbine is able to remain in service for a limited time (T), and in that a second limit value is predefined whereby, once this second limit value is exceeded, the wind turbine is shut down.

7. The method as claimed in claim 6, characterized in that a value between 1% and 5% of the rated voltage ($U_{rated}$) is predefined as the first limit value for the zero phase-sequence voltage ($U_0$).

8. The method as claimed in claim 7, characterized in that, once the first limit value is exceeded, the voltage of the electrical energy delivered by the generator is reduced.

9. The method as claimed in claim 7, characterized in that, once the second limit value is exceeded, rapid shutdown of the wind turbine takes place.

10. The method as claimed in claim 7, characterized in that, once the second limit value is exceeded, the wind turbine taps electrical energy from the grid system.

11. The method as claimed in claim 6, characterized in that, once the first limit value is exceeded, the voltage of the electrical energy delivered by the generator is reduced.

12. The method as claimed in claim 11, characterized in that, once the first limit value is exceeded, inductive reactive current is fed in the positive phase-sequence system and/or in the negative phase-sequence system.

13. The method as claimed in claim 12, characterized in that, once the second limit value is exceeded, rapid shutdown of the wind turbine takes place.

14. The method as claimed in claim 11, characterized in that, once the second limit value is exceeded, rapid shutdown of the wind turbine takes place.

15. The method as claimed in claim 6, characterized in that, once the second limit value is exceeded, rapid shutdown of the wind turbine takes place.

16. The method as claimed in claim 6, characterized in that, once the second limit value is exceeded, the wind turbine taps electrical energy from the grid system.

17. The method as claimed in claim 1, characterized in that, after stage c, the continuing operation of the wind turbine is made dependent upon the occurrence of an abrupt voltage variation.

18. A method for the operation of multiple wind turbines, wherein electrical energy is produced by means of a generator and fed into an electrical grid system in a number of phases (L1, L2, L3), whereby the electrical energy is fed to the secondary side of a transformer at a low voltage, and is delivered at a higher voltage on the primary side of the transformer, whereby the potential on the primary side of the transformer is undefined in relation to the ground potential, with the following stages:
   a. recording of a measured value for the voltage between the phases on the primary side of the transformer and the ground potential;
   b. comparison of the measured value with a predefined limit value;
   c. transmission of a signal to multiple wind turbines, if the measured value exceeds the limit value;
   d. adjustment of the power output of the multiple wind turbines.

19. The method as claimed in claim 18, characterized in that the measured value is transmitted to a farm master which governs the multiple wind turbines, and in that the farm master transmits a signal to the multiple wind turbines when the limit value is exceeded.

20. A wind turbine with a generator for the production of electrical energy, with a transformer which receives electrical energy from the generator on a secondary side, and delivers this electrical energy again at a higher voltage in a number of phases (L1, L2, L3) on a primary side, whereby the potential on the primary side of the transformer is undefined in relation to the ground potential, with a sensor for the recording of a measured value for the voltage between the phases (L1, L2, L3) on the primary side of the transformer and the ground potential, with a logic module for the comparison of the measured value with a predefined limit value, and with a control system which adjusts the electrical energy produced by the generator, if the measured value exceeds the limit value.

* * * * *